United States Patent [19]

Savage

[11] 4,342,228
[45] Aug. 3, 1982

[54] ANGULAR ACCELEROMETER

[75] Inventor: Howard T. Savage, Greenbelt, Md.

[73] Assignee: The United States of America as represented by the Secretary of the Navy, Washington, D.C.

[21] Appl. No.: 203,938

[22] Filed: Nov. 4, 1980

[51] Int. Cl.³ .............................................. G01P 15/08
[52] U.S. Cl. .................................................. 73/517 A
[58] Field of Search ............. 73/517 A, 517 R, 516 R, 73/505; 310/26, 329, 333, DIG. 4

[56] References Cited

U.S. PATENT DOCUMENTS

| 2,511,178 | 6/1950 | Roters | 73/517 R |
| 2,683,247 | 7/1954 | Wiley | 73/505 |
| 3,055,081 | 9/1962 | Roberts | 310/329 |
| 3,863,508 | 2/1975 | Scarborough et al. | 73/516 R |

OTHER PUBLICATIONS

"Perpendicular Susceptibility . . . ", by Savage et al.; IEEE Transactions on Magnetics, vol. Mag. 14, No. 5, pp. 545–547, Sep. 1978.

Primary Examiner—James J. Gill

[57] ABSTRACT

An angular accelerometer that has a high coupling factor, temperature stability and can function at low frequencies. The accelerometer is provided with a cylinder of Terfenol ($Tb_{0.27}Dy_{0.73}F_2$) positioned in a conducting non-ferromagnetic hollow cylinder having a ferromagnetic base and a ferromagnetic lid. The cylinder of Terfenol is compressed between the ferromagnetic lid and base with the compression adjusted for maximum magnetomechanical coupling and strength. Permanent magnets are also positioned in the hollow cylinder to provide magnetic bias to the Terfenol cylinder. When the accelerometer undergoes an angular acceleration about its cylindrical axis a voltage will appear between the center and the ends of the Terfenol cylinder. By measuring the voltage, the angular (rotational) acceleration of the accelerometer about its cylindrical axis may be determined.

18 Claims, 2 Drawing Figures

ANGULAR ACCELEROMETER

BACKGROUND OF THE INVENTION

The present invention relates to an angular accelerometer having a Terfenol cylinder and more particularly to an angular accelerometer that has a high coupling factor, high temperature stability and can function at low frequency.

Prior art angular accelerometers include piezoelectric transducers or gyroscopic elements, such as that disclosed in U.S. Pat. No. 3,863,508 of Scarborough et al. These prior art angular accelerometers are deficient in that the gyroscopic elements are extremely complex and require time-consuming and expensive maintenance while the piezoelectric transducers have relatively low coupling factors and poor low frequency response.

Additional background information on Terfenol and its physical properties is discussed in "Perpendicular Susceptibility, Magnetomechanical Coupling and Shear Modulus in $Tb_{0.27}Dy_{0.73}Fe_2$" by H. T. Savage and R. Abbundi, IEEE Transactions on Magnetics, Vol. Mag-14, No. 5, September 1978.

SUMMARY OF THE INVENTION

Accordingly, there is provided in the present invention an angular accelerometer that has a high coupling factor, high temperature stability and can function at low frequencies. The accelerometer is provided with a housing which incorporates a static magnetic field for magnetic bias. The housing is constructed with a conducting non-ferromagnetic hollow cylinder as a casing with a ferromagnetic lid and ferromagnetic base.

The housing is provided with a cylinder of Terfenol ($Tb_{0.27}Dy_{0.73}F_2$). The cylinder of Terfenol is positioned on the cylindrical axis of the housing so as to be coompressed by the base and lid. The compression may be adjusted for maximum magnetomechanical coupling and strength. Magnetic biasing means are also positioned in the housing to create the static magnetic field.

When the accelerometer undergoes angular acceleration (rotational acceleration about the cylindrical axis of the accelerometer) the Terfenol cylinder is subjected to torsion and generates a voltage between the center of the Terfenol cylinder and the ends of the cylinder. By measuring the generated voltage, the angular acceleration of the accelerometer may be determined.

OBJECTS OF THE INVENTION

It is an object of the present invention to provide an angular accelerometer that is shock resistant, inexpensive to construct and inexpensive to maintain.

Another object of the invention to provide an angular accelerometer that has a high coupling factor, high temperature stability and can function at low frequencies.

A further object of the invention is to provide an angular accelerometer which generates a voltage in response to torsional forces set up by the acceleration.

Other objects, advantages, and novel features of the present invention will become apparent from the following detailed description of the invention when considered in conjunction with the drawings.

BRIEF DESCRIPTION OF THE DRAWINGS

A more complete appreciation of the invention and many of the attendant advantages thereof will be readily understood by reference to the following detailed description when considered with the accompanying drawings in which like reference numerals designate like parts throughout the figures and wherein.

DESCRIPTION OF THE PREFERRED EMBODIMENT

Figure 1:
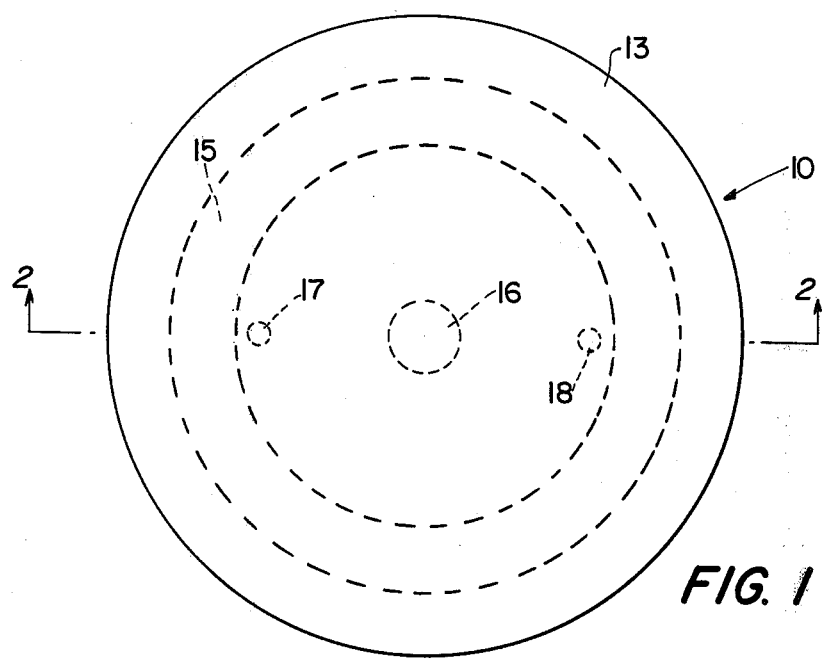
FIG. 1 shows a top plan view of the present invention.
Figure 2:
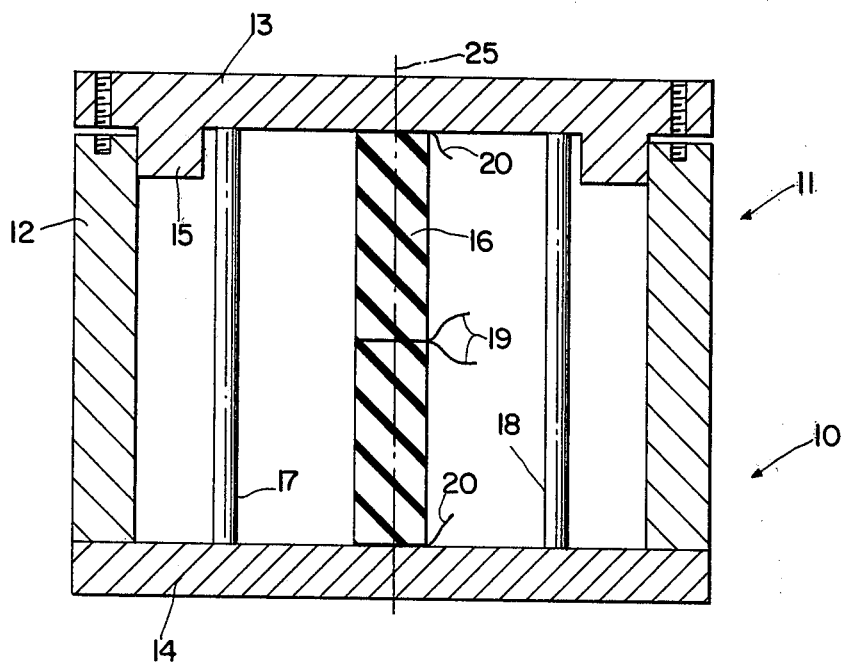
FIG. 2 shows a side cross-section of the accelerometer taken along line 2—2 of FIG. 1.

Referring to FIGS. 1 and 2 there is illustrated the angular accelerometer 10 of the present invention. The accelerometer is provided with housing 11. The housing is constructed with a conducting non-ferromagnetic hollow cylinder 12 which may be plastic or stainless steel, for example.

A cylinder of magnetoelastic material 16 is positioned in hollow cylinder 12 along cylindrical axis 25 between a ferromagnetic base 14 and a ferromagnetic lid 13, both of which have a high permeability. Lid 13 is provided with a projecting circular flange 15 which extends into cylinder 12. Lid 13 and base 14 may be fastened to hollow cylinder 12 by any suitable means.

The cylinder of magnetoelastic material 16 can be Terfenol ($Tb_{0.27}Dy_{0.73}Fe_2$) or equivalent magnetoelastic material. The cylinder of Terfenol is compressed between the lid and the base. The compression of the cylinder of Terfenol is adjusted for maximum magnetomechanical coupling and strength.

The accelerometer is also provided with magnetic biasing means, illustrated by numerals 17 and 18 in FIGS. 1 and 2. The biasing means may be a solenoid or hollow cylindrical permanent magnet positioned at 17 and 18. The solenoid can also be positioned around cylinder 16, not shown. It is also contemplated that the magnetic biasing means 17 and 18 can be incorporated into the housing by using a permanent magnetic material, in place of non-ferromagnetic cylinder 12 to create the static magnetic field.

The cylinder of Terfenol is provided with electrical connectors 19 and 20. Connector 19 is positioned at the axial center of the Terfenol cylinder while connectors 20 are positioned at the opposed cylindrical ends.

Angular acceleration of the accelerometer subjects the Terfenol cylinder to torsional forces which will generate a voltage between the center and ends of the Terfenol cylinder. By measuring this voltage, the angular acceleration of the accelerometer may be determined. The magnitude of the voltage depends on the magnitude of the torsional forces due to the angular acceleration.

It is apparent that the disclosed angular accelerometer provides an accelerometer that is shock resistant, inexpensive to construct and inexpensive to maintain. The accelerometer provides for a high coupling factor, high temperature stability and can function at low frequencies.

Many obvious modifications and embodiments of the specific invention, other than those set forth above, will readily come to mind to one skilled in the art having the benefit of the teachings presented in the foregoing description and the accompanying drawings of the subject invention and hence it is to be understood that such modifications are included within the scope of the appended claims.

What is claimed as new and desired to be secured by Letters Patent of the United States is:

1. A device for measuring acceleration comprising:
a compression housing having an axis;
magnetoelastic means positioned in and axially compressed by the housing;
magnetic biasing means positioned in the housing; and
means for measuring a voltage generated in the magnetoelastic means;
whereby when the device is angularly accelerated, a voltage is generated in the magnetoelastic means, said voltage being an indication of the acceleration.

2. A device as in claim 1 wherein the magnetoelastic means are compressed by the housing for maximum magnetomechanical coupling and strength.

3. A device as in claim 1 wherein the housng comprises a conducting non-ferromagnetic hollow cylinder.

4. A device as in claim 3 wherein the magnetoelastic means are axially compressed between the lid and the base.

5. A device as in claim 1 wherein the magnetoelastic means is a cylinder of magnetoelastic material positioned in and compressed by the housing.

6. A device as in claim 5 wherein the magnetoelastic material is $Tb_{0.27}Dy_{0.73}Fe_2$.

7. A device as in claim 1, 5 or 6 wherein the magnetoelastic means is compressed by the housing and the voltage is generated between the center and the ends of the cylinder.

8. A device as in claim 7 wherein the means for measuring the voltage are electrical leads attached to the center and ends of the cylinder.

9. A device as in claim 1 wherein the biasing means comprises a permanent magnet.

10. A device as in claim 1 wherein the biasing means comprise a solenoid.

11. A device for measuring acceleration, comprising:
a housing having a magnetic field, said housing having an axis, a ferromagnetic base and a ferromagnetic lid; and
magnetoelastic means positioned in and axially compressed by the housing;
whereby, when the device is angularly accelerated, a voltage is generated in the magnetoelastic means, said voltage being an indication of the acceleration.

12. A device as in claim 11 wherein the device further comprises:
magnetic biasing means; and
means for measuring a voltage generated in the magnetoelastic means.

13. A device as in claim 11 or 12 wherein the magnetoelastic means is compressed between the lid and the base.

14. A device as in claim 11 or 12 wherein the magnetoelastic means is a cylinder of $Tb_{0.27}Dy_{0.73}Fe_2$.

15. An angular accelerometer, comprising:
a housing, said housing having an axis, a static magnetic field, a conducting non-ferromagnetic hollow cylinder body, a ferromagnetic base and a ferromagnetic lid; and
a cylinder of $Tb_{0.27}Dy_{0.73}Fe_2$ positioned in and axially compressed by the housing;
whereby, when the accelerometer is angularly accelerated about its cylindrical axis, a voltage is generated in the cylinder of $Tb_{0.27}Dy_{0.73}Fe_2$, said voltage being an indication of the acceleration.

16. A device as in claim 15 wherein the cylinder of $Tb_{0.27}Dy_{0.73}Fe_2$ is compressed between the lid and the base of the housing.

17. A device as in claim 15 further comprising;
magnetic biasing means positioned in the housing; and
means for measuring a voltage generated in the cylinder of $Tb_{0.27}Dy_{0.73}Fe_2$.

18. A device as in claims 1, 11 or 15 wherein the housing is provided with a hollow cylinder of permanent magnetic material so as to create a magnetic field.

* * * * *